United States Patent [19]

Scarso

[11] Patent Number: 4,727,102

[45] Date of Patent: Feb. 23, 1988

[54] SELF-EXTINGUISHING POLYMERIC PRODUCTS BASED ON POLYOLEFINS

[75] Inventor: Luciano Scarso, Milan, Italy

[73] Assignee: V.A.M.P. S.r.l., Milan, Italy

[21] Appl. No.: 754,916

[22] Filed: Jul. 15, 1985

[30] Foreign Application Priority Data

May 14, 1985 [IT] Italy ............................ 20693 A/85

[51] Int. Cl.$^4$ ............................................. C08K 5/34
[52] U.S. Cl. .................................... 524/100; 252/609;
524/101; 524/304; 524/310; 524/399; 524/416;
524/502; 524/516; 523/201; 523/204; 523/205;
523/206
[58] Field of Search ................ 252/609; 524/100, 101,
524/304, 310, 399, 416, 502, 516; 525/227;
523/201, 204, 206, 205

[56] References Cited

U.S. PATENT DOCUMENTS

| | | | |
|---|---|---|---|
| 3,108,115 | 10/1963 | Little et al. | 548/229 |
| 3,293,224 | 12/1966 | Fitz-William, Jr. | 528/226 |
| 3,927,145 | 12/1975 | Gaeck et al. | 525/227 |
| 4,180,496 | 12/1979 | Yanagimoto et al. | 524/101 |
| 4,185,004 | 1/1980 | Mathis | 524/101 |
| 4,198,493 | 4/1980 | Marciandi | 524/416 |
| 4,341,880 | 7/1982 | Toyoda et al. | 524/101 |
| 4,514,328 | 4/1985 | Staendeke et al. | 524/416 |

FOREIGN PATENT DOCUMENTS 2403357  4/1979  France .

*Primary Examiner*—Morton Foelak
*Assistant Examiner*—Kriellion Morgan
*Attorney, Agent, or Firm*—Collard, Roe & Galgano

[57] ABSTRACT

Polyolefins which are made self-extinguishing by means of flame-retarding compositions comprising ammonium polyphosphate, melamine cyanurate and a hydroxyalkyl-derivative of isocyanuric acid at least partially in the form of a homopolymer.

3 Claims, No Drawings

SELF-EXTINGUISHING POLYMERIC PRODUCTS BASED ON POLYOLEFINS

This invention relates to homo- and copolymeric polyolefins (particularly polyethylene, polypropylene and ethylene-propylene rubbers) which are rendered self-extinguishing by means of flame-retarding compositions essentially consisting of phosphorus and nitrogen compounds.

As is known, for rendering self-extinguishing (or in any case flame-resistant) materials based on synthetic polymers, particular additives and mixtures thereof are used, which are usually known as "flame retardants". Said agents are normally selected from chlorinated or brominated organic compounds, metal compounds (particularly oxides, e.g., $Sb_2O_3$), phosphorus and relevant derivatives (such as for example elemental red phosphorus and ammonium polyphosphate), and various nitrogen-containing compounds, such as for example, urea, dicyandiamide, melamine. A particular nitrogen-containing cyclic product, utilized to prepare composite flame-retardants, is tris-(2-hydroxyethyl)-isocyanurate, known from French Pat. No. 2 307 813.

A technical problem to be solved each time when a self-extinguishing polymeric product is prepared by incorporation into it one or more flame-retardant, is that of limiting as much as possible the amounts of said agents in the abovesaid material, in order not to sensibly alter the chemical-physical and mechanical properties of the material itself.

Other problems to be solved, in the above-mentioned case, are those concerning the loss, due to extraction and migration of the flame retardants introduced into said materials, and the problem concerning the aging of said agents in terms of reduction of flame-retarding power of the flame retardants as a function of time and/or of particular chemical and/or physical factors of the external environment.

The prior art has suggested various more or less valid solutions of said problems, but the problems are still susceptible of being solved in an improved way.

Thus, it is an object of the present invention to provide a flame-retarding agent (composition), which is composite and improved.

Another object of the invention is that of providing plastic materials based on homopolymer and copolymer polyolefins (particularly polyethylene, polypropylene and ethylene-propylene rubbers), which are rendered efficaciously and stably self-extinguishing by incorporating said flame-retarding composition into them.

These and still further objects, which will be apparent from the following description, are achieved by polyolefins incorporating compositions which primarily consist of phosphorus and nitrogen compounds, said polyolefins comprising, according to the present invention (in amounts expressed in % by weight): (A) 5–60% of an ammonium polyphosphate of formula $(NH_4PO_3)_n$, in which n is preferably greater than 20, said polyphosphate being furthermore preferably in the form of particles which are micro-encapsulated in a water-repellent synthetic resin; (B) 1–25% of a hydroxyalkyl-derivative of the isocyanuric acid at least partially in the form of a homopolymer having formula:

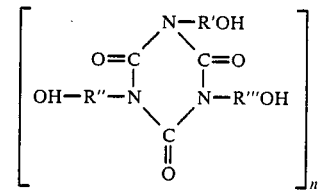

in which n is an integer ranging from 1 to about 500, and R', R" and R''' are alkyl radical, either like or unlike one another, containing from 1 to 6 carbon atoms, said hydroxyalkyl-derivative being preferably represented by tris-(2-hydroxyethyl)-isocyanurate; (C) 1–25% of melamine-cyanurate, said compositions comprising furthermore preferably also at least a stabilizer-antioxidant (of process and thermo-oxidation) selected from the group consisting of pentaerythrityl-tetrakis[3(3,5-diter.-butyl-4-hydroxyphenyl)]-propionate; distearyl-thio-dipropionate, dilauryl-thiodipropionate, bis(2,4-di-t-butylphenyl)-pentaerythritol-diphosphite; N-octadecyl-3(3,5-di-t-butyl-4-hydroxyphenyl)-propionate, said stabilizers-antioxidants being present in the aggregate in an amount of 0.1–1.0%.

Furthermore, according to the invention, in order to facilitate the proportioning (absence of powders, better free-flowing property) and a homogeneous dispersion of the abovesaid composite compositions in the polymeric materials to be rendered self-extinguishing, said compositions may also contain, in amounts of 10–30%, an olefinic copolymer selected from the group consisting of an ethylene-vinyl acetate copolymer and an ethylene-propylene rubber acting as a binding-carrying agent of the flame-retardants and of other conventional additives, if any, such as coadjuvants, dyestuffs, lubricants, antistatic agents and the like, included in said compositions. In this manner, a "concentrate" (known as "master-batch") of the abovesaid flame-retardants, ready to be added to the polyolefins is so formed.

The functions of components (A) and (B) are the typical ones of the flame-retardants, while component (C), i.e. the melamine cyanurate, has both a synergic antiflame function, particularly for (B) (whose amount can be therefore reduced), and the function of a thermal stabilizer for the flame-retarding compositions according to the invention.

For example, for rendering self-extinguishing the polypropylene (to the "V-0" degree level, according to the known "UL-94" test of Underwriter Laboratories—USA), it is necessary to incorporate into the same (in % by weight referred to the total of the composition) 15% of ammonium polyphosphate and 20% of tris-(2-hydroxyethyl)-isocyanurate (obtaining, however, a product having poor mechanical and thermal characteristics), while by adding also melamine cyanurate, the necessary amounts are as follows: 15% of ammonium polyphosphate, 5% of tris-(2-hydroxyethyl)-isocyanurate and 5% of melamine cyanurate, thus obtaining at last a product having also good mechanical and thermal properties.

Other melamine salts (such as borate, phosphate or sulphate) and melamine itself do not provide so effective results as the ones provided by melamine cyanurate. As regards the abovecited stabilizing-antioxidizing substances according to the invention, their function is both (and chiefly) that of "stabilizing" in the time the flame-retarding power of the compositions forming the object of the present invention, and that of acting as stabilizer-antioxidant for the polyolefinic materials comprising one of said compositions.

Component (A) is selected in the micro-encapsulated form and component (B) is selected in the homopolymer form particularly when the compositions forming the object of the present invention are to be used for rendering self-extinguishing polyolefinic materials for electrical appliances and in any case for uses which require low water absorption by said materials.

The abovesaid compositions are used, as already said hereinbefore, to obtain self-extinguishing materials based on polyolefins, by incorporation of said compositions into said materials, said incorporation occurring according to the prior art, for example by mixing-melting in the plastic state, in screw-extruders.

According to the invention, the abovesaid compositions, when in the form of powders, essentially contain:
- 40-80% by weight, approx., of ammonium polyphosphate,
- 10-30% by weight, approx., of tris-(2-hydroxyethyl)isocyanurate,
- 10-30% by weight, approx., of melamine-cyanurate (plus, optionally, conventional additives of polyolefins), said tris-(2-hydroxyethyl)-isocyanurate being either as such (monomer), or in the form of homopolymer, or of a mixture of both.

Always according to the invention, the same compositions, when in the form of concentrates ("master-batch") include furthermore also 10–30% of an olefinic copolymer selected from the group consisting of an ethylene-vinyl acetate copolymer and an ethylene-propylene rubber (amounts expressed as % by weight).

The total composition amounts according to the invention to be incorporated into the polyolefinic materials are, in the order, of 7–70% by weight (referred to the total). For example, about 20–40% thereof is incorporated into polypropylene, about 25–50% thereof into polyethylene and about 30–60% into the ethylene-propylene rubbers, thus obtaining self-extinguishing materials of V-0 degree according to UL-94 (Underwriter Laboratories—USA). Among said self-extinguishing materials based on polyolefins, fibres and paints are included.

The compositions according to the present invention are prepared according to conventional methods, for example by mixing the individual components in a vertical quick mixer and optionally by subsequent mixing-granulating in an extruder or the like.

As already pointed out hereinabove, a preferred embodiment of the invention consists in selecting, as component (B), tris-(2-hydroxyethyl)-isocyanurate in the form of homopolymer. Such hompolymer is obtainable by heating the monomer to 150°–250° C. in the presence of a proper condensation-etherification catalyst, as is described in detail in U.S. Pat. No. 3,293,224.

If the composition of the invention contains the tris-(2-hydroxyethyl)-isocyanurate (component (B)) in the form as such (and not as a homopolymer), then it is apparent that during the process for incorporating said composition into a polyolefin (for example by mixing-melting in hot conditions, in the plastic state, in screw-extruders, in injection molding presses and the like) said isocyanurate (monomer) is transformed, at least partially, into the corresponding homopolymer (as it is in the presence of ammonium polyphosphate that it acts as a condensation catalyst of the type of those utilized in U.S. Pat. No. 3,293,224) and, at least in part, into 2-oxazolidone (as it is said in U.S. Pat. No. 3,108,115), said 2-oxazolidone having itself flame retardant effect in the composition.

In the above-mentioned case, tris-(2-hydroxyethyl)-isocyanurate is preferably selected, according to the invention, in the form of particles encapsulated with an inorganic or organic water-repellent material, such as for example $Al_2O_3$, an epoxy resin and the like. The advantages of the invention can be summarized as follows:
- negligible migration (extraction), in the course of time, of the individual components of the flame-retarding composition from the polyolefinic materials in which they are incorporated,
- stability of the "flame-extinguishing power" of the components of the flame-retarding composition prepared, according to the invention, by addition of the abovesaid stabilizing-antioxidizing substances,
- low amounts of flame-retarding agents to be introduced into the polyolefinic materials to be made self-extinguishing, with the consequent advantage of not remarkably altering the physical and mechanical properties of said materials.

The following examples are given to better illustrate the present invention, without being however a limitation thereof.

EXAMPLE 1

In a vertical quick mixer there was prepared a mixture consisting of the following components, expressed in % by weight with respect to the total of the mixture:
- 19% of ethylene-vinyl acetate copolymer (at 80% of ethylene);
- 50% of ammonium polyphosphate microencapsulated with an epoxy resin (Exolit 455 produced by Hoechst, Frankfurt/Main);
- 15% of tris-(2-hydroxyethyl)-isocyanurate homopolymer (prepared according to U.S. Pat. No. 3,293,224);
- 15% of melamine cyanurate;
- 0.3% of pentaerythrityl-tetrakis[3(3,5-di-t-butyl-4-hydroxyphenyl)]-propionate ("Irganox 1010" manufactured by Ciba Geigy, Basle);
- 0.5% of dilauryl-thiodipropionate (Irganox PS800 manufactured by Ciba Geigy, Basle);
- 0.2% of bis(2,4-di-t-butylphenyl)-pentaerythritoldiphosphite (Ultranox 624 manufactured by Borg Warner Chemicals, Parkersburg).

The mixture so obtained was then granulated in a screw extruder at a temperature of about 100° C., finally obtaining a granular composition in the form of "concentrate" (master-batch) ready for use as a flame retardant. Said composition proved to be very stable even after long-lasting storage periods (5–6 months).

A part of the abovesaid composition (master-batch) was utilized to prepare—by mechanical mixing—a mixture consisting for 65% of polypropylene and for 35% of said composition, such mixture being subsequently mixed and molten in the plastic state in a screw extruder, in order to obtain 3×3 mm cylindrical granules, ready to be transformed into finished or semifinished shaped articles by means of the conventional molding techniques, for example injection molding and extrusion.

The polypropylene thus obtained proved to be self-extinguishing according to degree V-0 of the above-cited standards UL-94. Said self-extinguishing power degree was exhibited by the polypropylene even after the known test UL-746 B (residence in an air-circulation oven during 1500 hours at 150° C.).

The same polypropylene did not undergo substantial alterations in its dielectrical characteristics after the known water absorption test ASTM-D 570 (the amounts being expressed in % by weight).

EXAMPLE 2

A portion of the composition (master-batch) obtained in example 1 was utilized to prepare a mixture consisting for 55% by weight of low density polyethylene and for 45% by weight of said composition, said mixture being obtained and transformed into granules by operating as in example 1. Also this polymeric product (like the one of example 1) proved to be self-extinguishing according to degree V-0 (UL-94) both before and after the above-cited test UL-746 B.

EXAMPLE 3

A portion of the composition (master-batch) obtained in example 1 was utilized to prepare a mixture consisting—expressed in % by weight—for 45% of ethylene-propylene rubber and for 55% of said composition, said mixture having been obtained and transformed into granules by operating as in example 1. Also this polymeric product (like that of example 1) proved to be self-extinguishing according to degree V-0 (UL-94) both before and after the already cited UL-746 B test.

EXAMPLE 4

In a quick mixer there was prepared a mixture containing (in % by weight):
- 59% of Exolit 422 (ammonium polyphosphate),
- 20% of tris-(2-hydroxyethyl)-isocyanurate,
- 20% of melamine cyanurate,
- 0.5% of n-octadecyl-3(3,5-di-t-butyl-4-hydroxyphenyl-propionate (Irganox 1076 produced by Ciba Geigy, Basle),
- 0.5% of distearyl-thiodipropionate (Irganox PS 802 manufactured by Ciba Geigy, Basle).

It should be noticed that the above-reported composition does not contain the ethylene-vinyl acetate copolymer (which, conversely, is present in example 1).

The aforesaid composition was incorporated into the polypropylene in the form of powder (in an amount of 30% by weight), said incorporation being carried out by means of a Banbuty-extruder-granulator line, at temperature of 190°–230° C. It should be noticed that at such temperatures the tris-(2-hydroxyethyl)-isocyanurate is converted, at least partially, into the corresponding homopolymer and into 2-oxazolidone, as is revealed by the infrared spectra performed on the ethanol extract of the self-extinguishing polypropylene incorporating the abovesaid flame-retarding composition.

In fact, in such spectra the absorption bands are substantially reduced at 1030 cm$^{-1}$ and at 1140 cm$^{-1}$ typical of the hydroxyl group, and the same spectra further significantly differ from the analogous infrared spectra of the starting tris-(2-hydroxyethyl)-isocyanurate. The final results are substantially similar to the ones of example 1.

I claim:

1. In a flame retardant additive composition for polyolefins of the type comprising ammonium polyphosphate and tris-(2-hydroxyethyl)-isocyanurate in the form of a homopolymer, the improvement comprising said composition additionally including melamine-cyanurate.

2. The composition according to claim 1, wherein the amount of said ammonium polyphosphate is in the range of 40 to 80% by weight, said tris-(2-hydroxyethyl)-isocyanurate homopolymer is in the range of 10 to 30% by weight and said melamine-cyanurate is in the range of 10 to 30% by weight.

3. A self-extinguishing polyolefin composition, comprising:
   (A) 5–50% by weight of ammonium polyphosphate;
   (B) 1–25% by weight of a homopolymer of tris-(2-hydroxyethyl)-isocyanurate, the improvement comprising said polyolefin additionally including
   (C) 1–25% of melamine-cyanurate.

* * * * *